(12) United States Patent
Hefti et al.

(10) Patent No.: US 6,484,341 B2
(45) Date of Patent: Nov. 26, 2002

(54) DOUGH ROLLER (75) Inventors: Rolf Hefti, Cugnasco (CH); Walter Ruffner, Maienfeld (CH)

(73) Assignee: The Pampered Chef, Ltd., Addison, IL (US)

( * ) Notice: Subject to any disclaimer, the term of this patent is extended or adjusted under 35 U.S.C. 154(b) by 0 days.

(21) Appl. No.: 09/795,647

(22) Filed: Feb. 28, 2001

(65) Prior Publication Data

US 2002/0116767 A1 Aug. 29, 2002

(51) Int. Cl.[7] .................................................. B25F 1/00
(52) U.S. Cl. ............................................. 7/111; 492/13
(58) Field of Search ...................... 492/13, 14; 7/110, 7/111, 112

(56) References Cited

U.S. PATENT DOCUMENTS

| | | | | |
|---|---|---|---|---|
| 128,462 A | * | 7/1872 | Charwick ...................... 7/111 |
| 689,848 A | * | 12/1901 | Booth ........................... 7/111 |
| 2,496,062 A | * | 1/1950 | Morfesi ......................... 7/112 |
| 3,157,135 A | * | 11/1964 | Fetrow et al. ................. 492/14 |
| 5,393,289 A | * | 2/1995 | Green .......................... 492/13 |
| 5,729,854 A | * | 3/1998 | Powers ......................... 7/110 |
| 6,049,970 A | * | 4/2000 | Reis et al. .................... 492/13 |

* cited by examiner

Primary Examiner—James G. Smith
(74) Attorney, Agent, or Firm—Olson & Hierl, Ltd.

(57) ABSTRACT

A consolidated pastry forming apparatus is provided that incorporates a separatable roller tool and a finishing tool. The roller tool includes a handle, a first pair of fork arms at one handle end, and a second pair of fork arms at the other handle end. A first cylindrical dough roller is mounted to the first pair of fork arms and a second convex dough roller is mounted to the second pair of fork arms. The finishing tool is removably attachable to the handle. The finishing tool is unitarily formed and somewhat elongated, and includes at one end thereof a plurality of tines suitable for puncturing a pastry crust, and at the other end thereof a protrusion suitable for crimping a pastry crust.

31 Claims, 5 Drawing Sheets

DOUGH ROLLER

TECHNICAL FIELD OF THE INVENTION

This invention relates to the field of pastry forming apparatus and more particularly to a pastry forming apparatus wherein a plurality of tools for the forming and working of dough and pastry are detachably interconnected together.

BACKGROUND OF THE INVENTION

A cook or baker commonly has access to and utilizes many different tools in the preparation of food. These tools are typically stored collectively and loosely in drawers and the like in a kitchen area. When food is being prepared, the cook or baker must access and retrieve particular tools from the collection. Commonly, considerable time can be lost in locating, retrieving and collecting the specific tools needed or desired for a particular preparation task.

In the interest of saving time and labor, it would be desirable and useful to have tools that are employed in a given preparation procedure consolidated and thus stored together. Thereby, the task of locating, collecting and retrieving individual tools is simplified and shortened, and time and labor are conserved.

In a single pastry forming (including preparation) procedure, as those skilled in the art will appreciate, various individual and separate roller and crust forming and shaping tools are commonly employed, perhaps four or more separate tools being utilized. If a particular generic set of these tools could be consolidated into a common structural arrangement, then the foregoing problems associated with locating, collecting and retrieving individual separated tools are eliminated, or greatly minimized, since only one tool assembly would need to be preliminarily located from a general tool collection, which could be a brief and simple matter.

In pastry forming, a starting dough body is typically spread and rolled into a flattened sheet-like configuration using a roller to produce a crust (for subsequent processing). Prior art rollers include rolling pins and (typically) smaller rollers. The former comprise a cylindrical roller with an axially projecting and rotatable handle at each opposite end for two-handed operation. The latter comprise a roller whose opposite ends are rotatably associated with opposite terminal ends of a fork or yoke that is itself joined to a handle that extends perpendicularly and medially relative to the roller axis for single handed operation. The latter rollers are commonly either cylindrically shaped, or barrel-shaped (outwardly convex and relatively short in length), the latter configuration apparently being useful for rolling dough up the side of a container, such as a pie pan, or the like.

Also, in pastry forming, finishing tools are commonly employed. Common finishing tools include a fork-like tool having projecting sharp tines and a crimping tool. The fork-like tool is commonly used for making puncture holes in the upper crust of a pie to permit steam to escape from the pie during baking. The crimping tool is commonly used to impress and join together adjoining rim portions of the upper and lower crusts of a pie before baking.

There is a need in the pastry forming art for an improved consolidated pastry forming apparatus that incorporates both dough rolling means and pastry finishing means. The present invention aims to fulfill this need.

SUMMARY OF THE INVENTION

The present invention is directed to consolidated pastry forming apparatus that incorporates roller means and finishing means and wherein certain individual tool components coact yet are conveniently and simply detachably associated with one another.

The roller means comprises a roller assembly that includes an elongated handle which has a fork at each opposite end. Each fork has a roller rotatably mounted between the terminal ends thereof for rotation about an axis that is generally transverse to a longitudinal axis of the handle. One roller has a cylindrical side surface, the other is relatively shorter and has a convex side surface.

The finishing means comprises a unitarily formed tool that includes a generally flattened, somewhat elongated handle. At one handle end is a plurality of outwardly projecting tines for dough puncturing or marking, and at the opposite handle end is an enlargement for dough crimping or localized compressing.

The finishing tool is removably connected to portions of the roller assembly handle. Although this connection can be variously achieved, it is presently preferred to provide opposite side portions of the finishing tool with longitudinally extending, outwardly projecting flange portions that are configured to engage matingly rabbet portions provided in opposing side edge portions of the handle of the roller assembly.

When associated with the roller assembly, side surface portions of the finishing tool cooperate with the handle of the roller assembly to provide a smooth and easily held composite handle member that is useful in dough rolling using either one of the two rollers.

Thus, the inventive consolidated pastry forming apparatus incorporates a reversibly interconnected and cooperatively associated set of pastry forming tools comprising two independently operated dough rollers, a pastry (or dough) puncturing and marking tool and a pastry (or dough) crimping or localized compressing tool.

The inventive consolidated pastry forming apparatus provides a generic set of pastry forming and working tools in a common structural arrangement.

The apparatus is sturdy, convenient, easy to use and maintain and readily stored and retrieved for use in a pastry forming and/or working procedure.

Other and further objects, features, purposes and advantages of the present invention will be apparent to those familiar with the pastry and pastry tool arts from the following description taken with the accompanying drawings and the appended claims.

DESCRIPTION OF THE PREFERRED EMBODIMENT

Figures 1, 2:
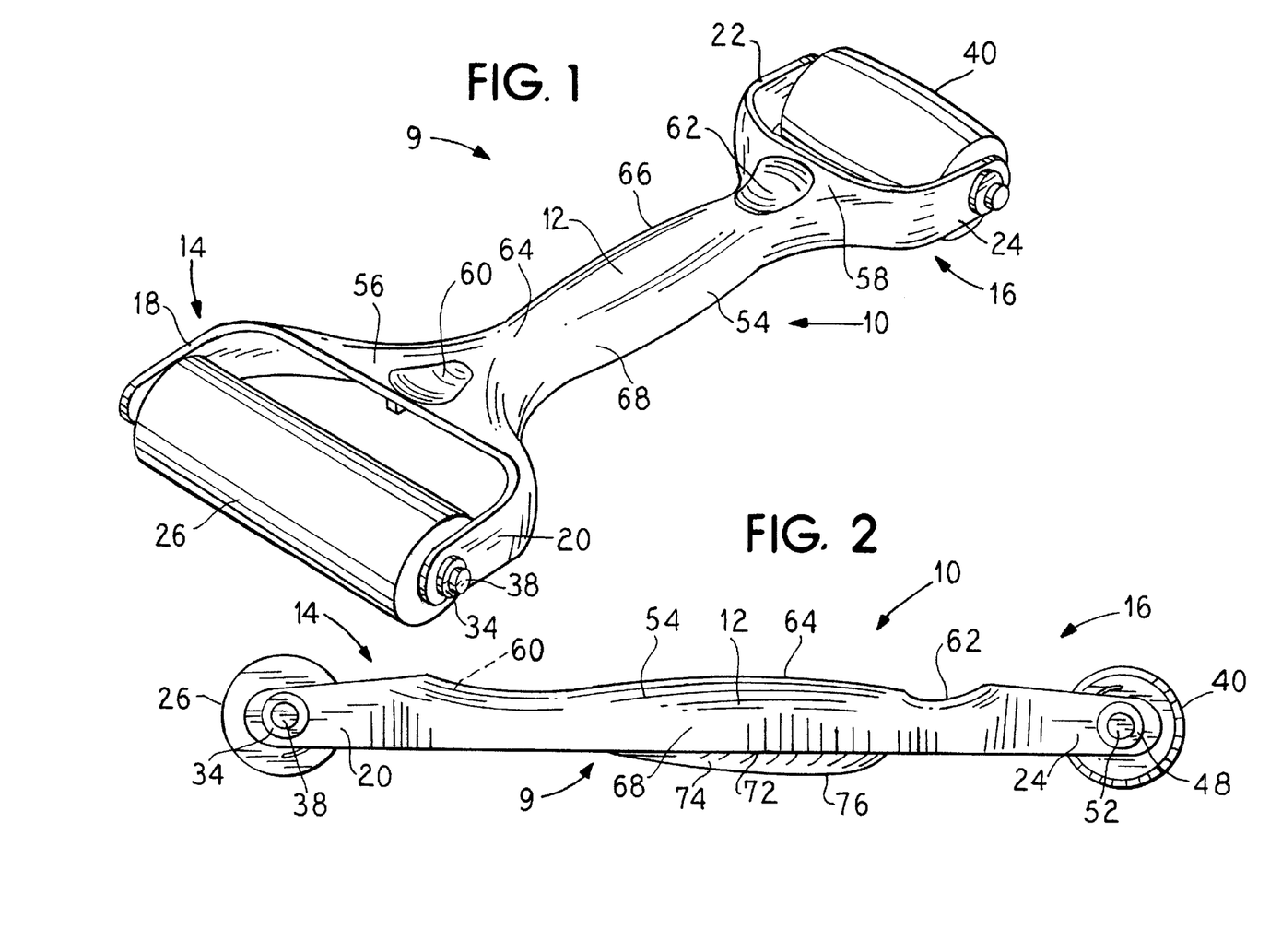
FIG. 1 is a perspective view of a dough roller or pastry forming apparatus constructed in accordance with the present invention.
FIG. 2 is a side elevational view of the dough roller of FIG. 1.
Figure 3:
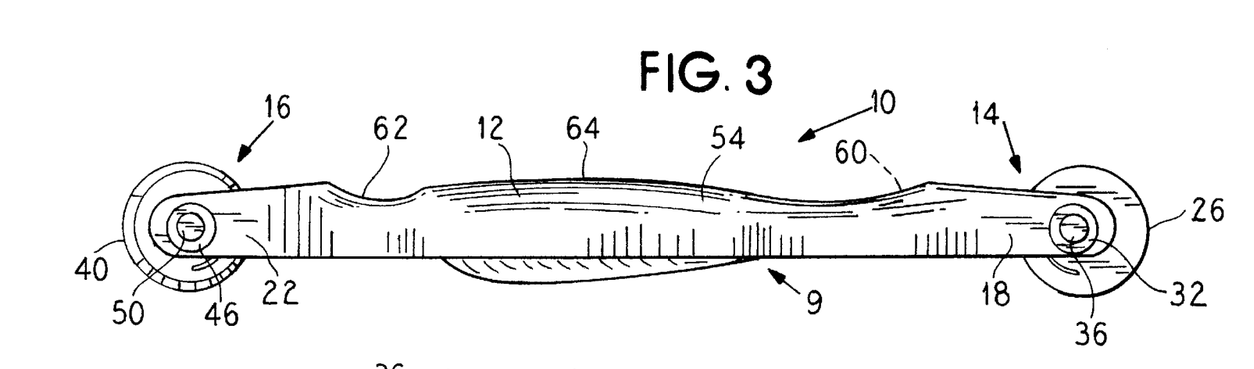
FIG. 3 is an opposite side elevational view of the dough roller of FIG. 1.
Figure 4:
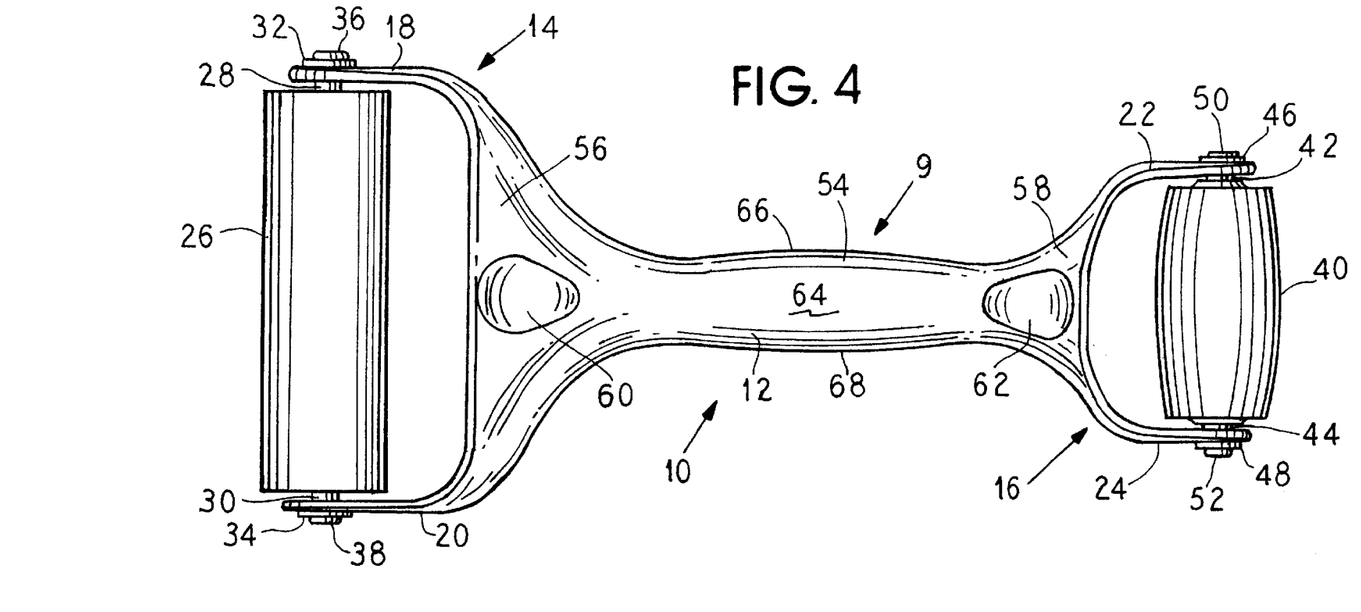
FIG. 4 is a top plan view of the dough roller of FIG. 1.

Referring to the Figures, there is seen an embodiment 9 of the consolidated pastry forming apparatus of this invention. The apparatus 9 incorporates a dough roller 10 that can be considered to be a primary or main structure and a detachably connected pastry finishing tool 74 (see FIG. 2, for example) that can be considered to be a secondary or auxiliary structure.

Dough roller 10 includes a handle 12 having a first forked end 14 and a second forked end 16 at respective opposite ends thereof. First forked end 14 includes a pair of fork arms 18 and 20. Second forked end 16 includes a pair of fork arms 22 and 24.

Disposed between fork arms 18 and 20 at first forked end 14 is a first roller 26 with cylindrically curved sides having axle stubs 28 and 30 extending from opposite axial ends thereof. Axle stubs 28 and 30 are received through flanged bushings 32 and 34 mounted in holes in fork arms 18 and 20, respectively. The bushings 32,34 are sized to permit free rotation of axle stubs 28 and 30 therein. Hence, first cylindrical roller 26 is mounted between fork arms 18 and 20 of first forked end 14 for rotation about its axis, transverse to the longitudinal axis of handle 12. Axle stubs 28,30 are upset at their outer ends 36,38, respectively. Axle stubs 28 and 30 are thereby prevented from slipping out of the flanged bushings 32,34 in fork arms 18,20, respectively.

Disposed between fork arms 22 and 24 at second forked end 16 is a second roller 40 with convexly curved sides having axle stubs 42 and 44 extending from opposite axial ends thereof. Axle stubs 42 and 44 are received through flanged bushings 46 and 48 mounted in holes in fork arms 22 and 24, respectively. The bushings 46,48 are sized to permit free rotation of axle stubs 42 and 44 therein. Hence, second convex roller 40 is mounted between fork arms 22 and 24 of second forked end 16 for rotation about its axis, transverse to the longitudinal axis of handle 12. Axle stubs 42 and 44 are upset at their outer ends 50,52, respectively. Axle stubs 42 and 44 are thereby prevented from slipping out of the flanged bushings 46,48 in fork arms 22,24, respectively.

Handle 12 includes a central grip region 54 and a broadened, generally triangular transition region 56 at forked end 14 from which fork arms 18 and 20 extend. Similarly, handle 12 includes a broadened, generally triangular transition region 58 at forked end 16 from which fork arms 22 and 24 extend. The upper surface of transition region 56 includes a depressed concave thumb rest 60 aligned with the longitudinal axis of handle 12. Likewise, the upper surface of transition region 56 includes a depressed concave thumb rest 62 aligned with the longitudinal axis of handle 12.

Thumb rest 60 receives the thumb of a user whose fingers are curled below and around grip region 54 of handle 12, with the thumb pointing toward first cylindrical roller 26. By pressing downwardly with the thumb on thumb rest 60, downward pressure can be transferred through fork arms 18 and 20 to first cylindrical roller 26, and thence to dough being rolled by roller 26.

Alternatively, handle 12 can be reversed in the user's hand such that thumb rest 62 receives the thumb of a user whose fingers are curled below and around grip region 54 of handle 12, with the thumb pointing toward second convex roller 40. By pressing downwardly with the thumb on thumb rest 62, downward pressure can be transferred through fork arms 22 and 24 to second convex roller 40, and thence to dough being rolled by roller 40.

Handle 12 is generally U-shaped in cross-section, (see FIG. 15, for example) an upper wall 64, a side wall 66, and an opposite side wall 68. Side wall 66 extends at opposite ends to form fork arms 18 and 22, respectively. Side wall 68 extends at opposite ends to form fork arms 22 and 24, respectively. Upper wall 64 extends at opposite ends to form transition regions 56 and 58, respectively. Side walls 66 and 68 terminate in lower edges 70 and 72 that are spaced apart laterally.

Figure 5:
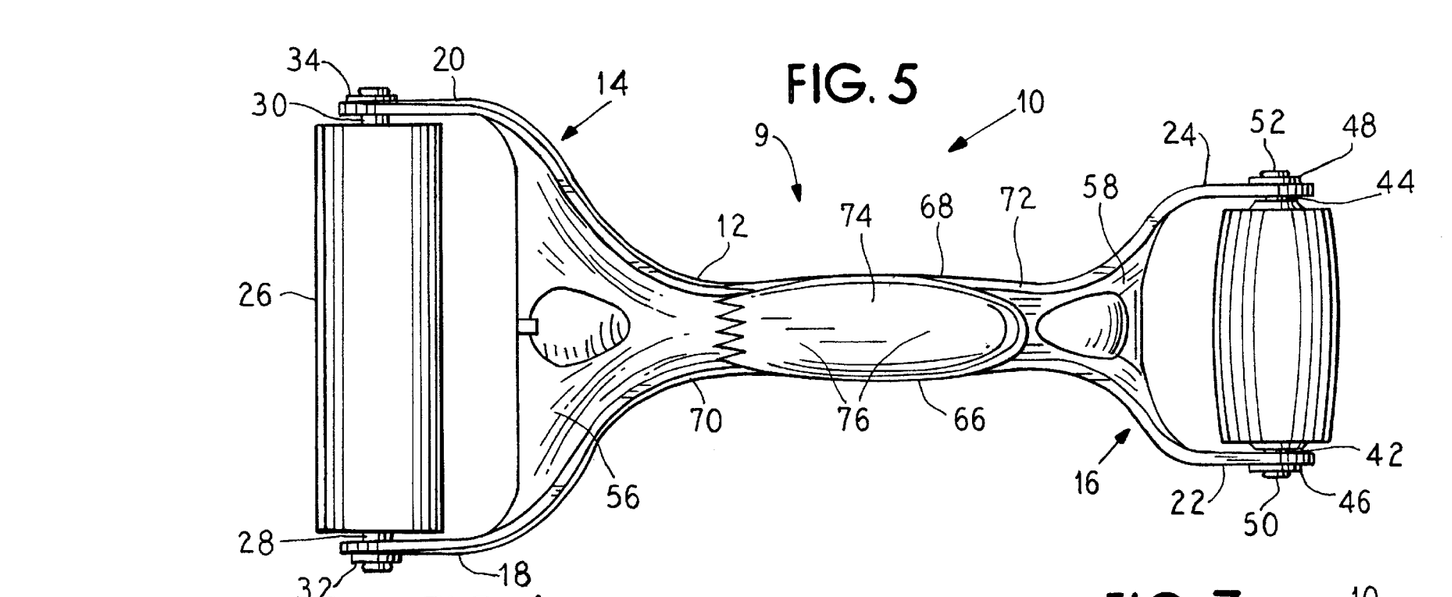
FIG. 5 is a bottom plan view of the dough roller of FIG. 1.
Figure 6:
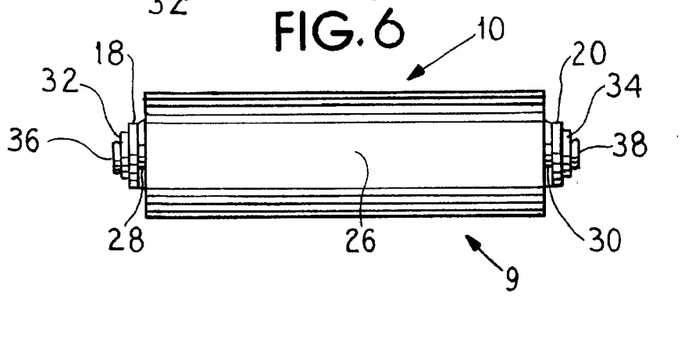
FIG. 6 is an end view of the dough roller of FIG. 1.
Figure 7:
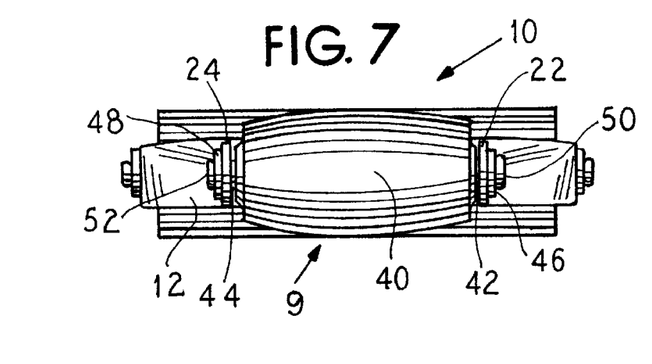
FIG. 7 is an opposite end view of the dough roller of FIG. 1.

Referring particularly to FIG. 5, the bottom of dough roller 10 is illustrated, showing removable pastry tool 74 that spans between and is connected to edges 70 and 72 of handle 12. Pastry tool 74, when assembled to dough roller 10 as shown in FIG. 5, comprises part of grip region 54 of handle 12 and provides a convexly contoured lower surface 76. Pastry tool 74 also provides a smooth transition from lower surface 76 to side walls 66 and 68 at edges 70 and 72 of handle 12. Consequently, handle 12 can be gripped comfortably by the user's hand while pastry tool 74 is assembled thereto, with the fingers curled under and across lower surface 76. Uncomfortable contact between the user's hand and edges 70 and 72 is thereby substantially avoided. Pastry tool 74 is assembled to handle 12 in elastic snap-fitting engagement such that pastry too 74 can repeatedly be assembled to and removed from handle 12. When removed, pastry tool 74 comprises a utensil that is useful in the preparation of pie crust and the like.

Figures 8, 9, 10, 11, 12, 13, 14:
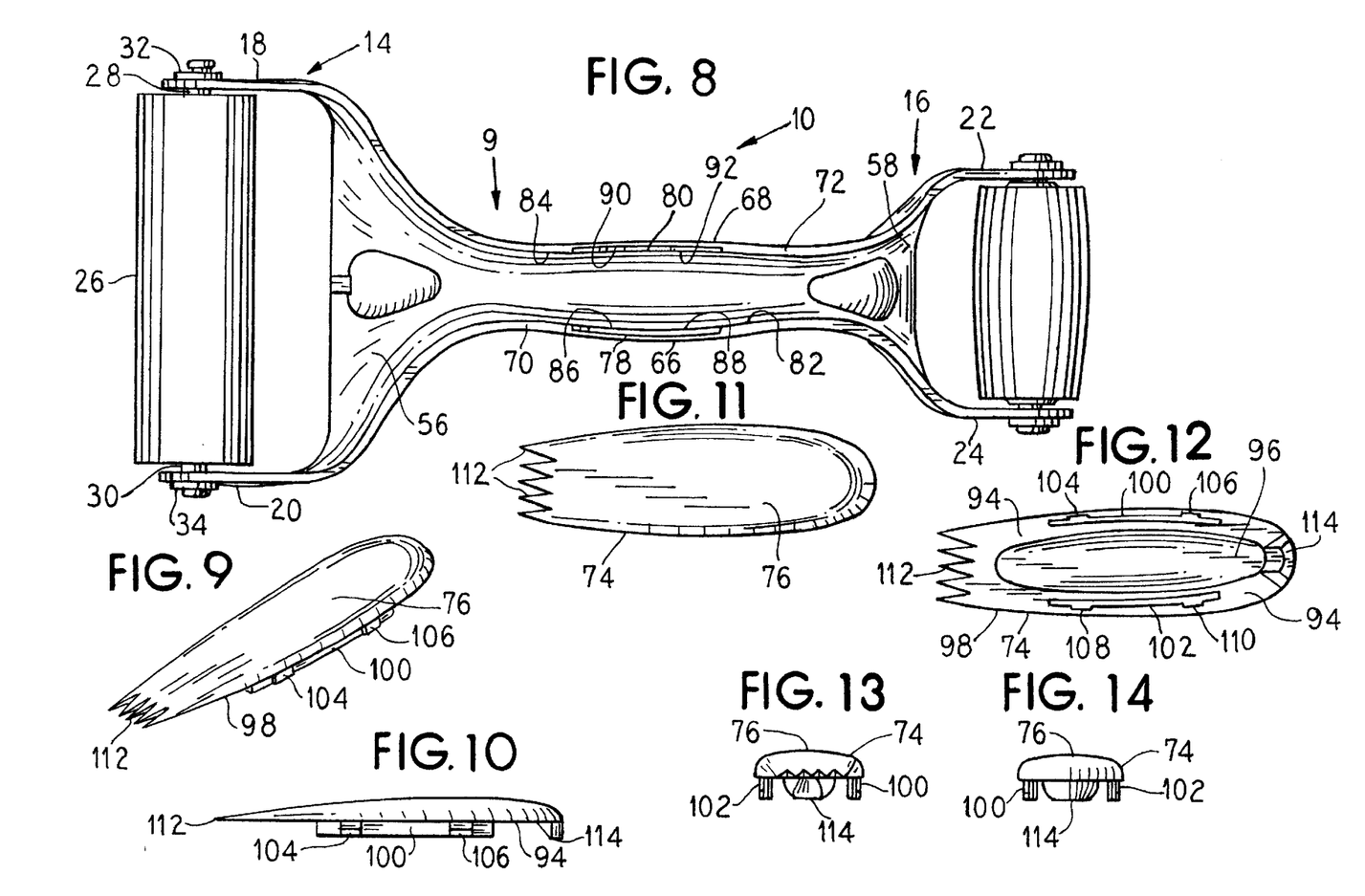
FIG. 8 is a bottom plan view of the dough roller of FIG. 1 with the removable pastry finishing tool or component removed from the handle.
FIG. 9 is a perspective view of the removable pastry tool of the dough roller of FIG. 1.
FIG. 10 is a side view of the removable pastry tool of FIG. 9.
FIG. 11 is a bottom plan view of the removable pastry tool of FIG. 9.
FIG. 12 is a top plan view of the removable pastry tool of FIG. 9.
FIG. 13 is an end view of the removable pastry tool of FIG. 9.
FIG. 14 is an opposite end view of the removable pastry tool of FIG. 9.
Figure 15:
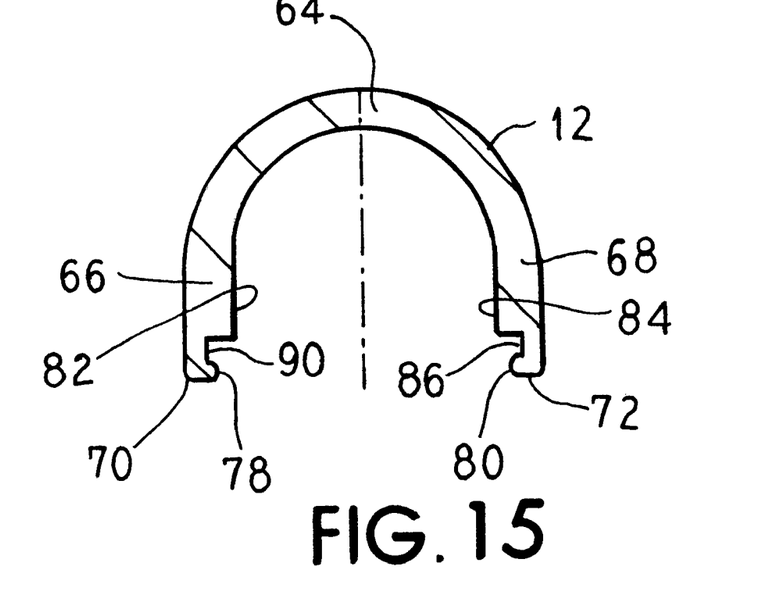
FIG. 15 is a transverse cross-sectional view through the handle of the embodiment of FIG. 1, taken through one set of rabbet notches.
Figure 16:
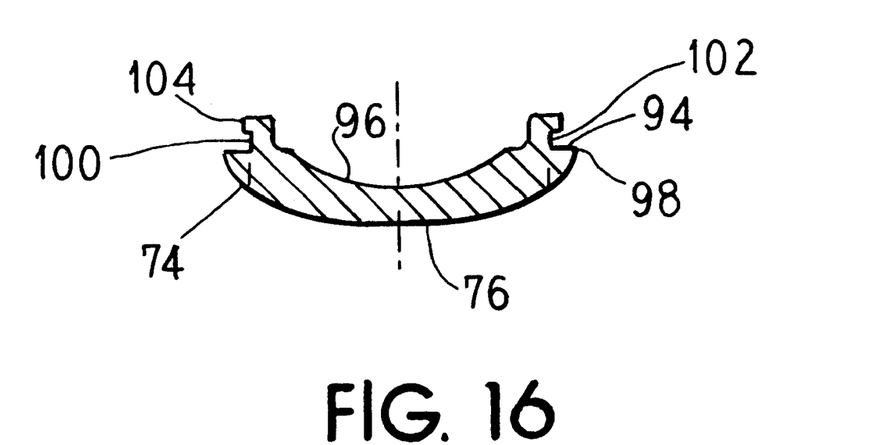
FIG. 16 is a transverse cross-sectional view through the finishing tool of the embodiment of FIG. 1, taken through one set of tabs.

Referring especially to FIGS. 8 and 15, the removable attachment of pastry tool 74 to handle 12 is enabled in part by a pair of rabbets 78 and 80 at the intersection, respectively, of lower edges 70 and 72 and inner side surfaces 82 and 84 of side walls 66 and 68. Disposed in spaced relationship with respect to each other and within rabbet 78 are a pair of longitudinally spaced notches 86 and 88 undercut into side wall 66. Likewise, disposed in spaced relationship with respect to each other and within rabbet 80 are a pair of longitudinally spaced notches 90 and 92 undercut into side wall 68. Rabbets 78 and 80, and notches 86, 88, 90 and 92 cooperate with pastry tool 74 to provide a releasable engagement with handle 12, as described further below.

Referring now to FIGS. 9–14 and 16, pastry tool 74 is shown removed from handle 12. Pastry tool 74 includes a substantially flat upper perimetrical surface 94 surrounding an oval, concave central depression 96. Lower surface 76 is convex and intersects upper surface 94 at a perimetrical edge 98. Extending upwardly from upper perimetrical surface 94 is an elongate wall 100 that is sized and located to be received in close fitting engagement within rabbet 78 of handle 12. Similarly, an opposed elongate wall 102 extends upwardly from perimetrical surface 94 and is disposed on the opposite side of depression 96. Elongate wall 102 is sized and located to be received in close fitting engagement within rabbet 80 of handle 12.

Extending outwardly and laterally from elongate wall 100 are a pair of tabs 104 and 106 that are longitudinally spaced relative to each other and located to be received within notches 86 and 88, respectively, of handle 12. Likewise, extending outwardly and laterally from elongate wall 102 are a pair of tabs 108 and 110 that are longitudinally spaced relative to each other and located to be received within notches 90 and 92, respectively, of handle 12.

Pastry tool 74 can be assembled to handle 12 by pressing tool 74 against lower edges 70 and 72 such that upstanding walls 100 and 102 are received within rabbets 78 and 80. Under such pressure, lower edges 70 and 72 are forced to spread elastically and laterally away from each other just enough to permit tabs 104, 106, 108 and 110 to snap into undercut notches 86, 88, 90 and 92, respectively. Handle 12, constructed of injection molded plastic, is sufficiently elastic to permit such elastic spreading. Tool 74 remains attached to handle 12 until such time as the user desires to remove it by pulling one end or the other of tool 74 away from handle 12, resulting in disengagement of tabs 104, 106, 108 and 110 from undercut notches 86, 88, 90 and 92.

It is desirable to remove pastry tool 74 from handle 12 from time to time, especially after the user has finished rolling out the dough to make upper and lower pie crusts, for example. After the lower crust, pie filling, and upper crust have been placed in a pie pan, pastry tool 74 can be used advantageously to finish the pie crust. A plurality of sharp tines 112 that extend longitudinally from one end of pastry tool 74. Tines 112 can be used to puncture holes in the upper pie crust to permit steam to escape from the pie during baking. Furthermore, a crescent-shaped protrusion 114 extends upwardly from upper perimetrical surface 94 at the opposite end of tool 74, which protrusion 114 can be used to crimp the upper and lower pie crusts together around the rim of the pie plate.

Although the present invention has been described in detail in terms of preferred embodiments, the scope of the invention in which an exclusive right is claimed is defined by the claims appended below:

What is claimed is:

1. A dough roller comprising:
   a handle having a longitudinal axis and a first pair of fork arms at one end thereof and a second pair of fork arms at the other end thereof;
   a first roller mounted to the first pair of fork arms for rotation about an axis substantially transverse to the longitudinal axis of the handle;
   a second roller mounted to the second pair of fork arms for rotation about an axis substantially transverse to the longitudinal axis of the handle; and
   a pastry tool removably attachable to the handle.

2. The dough roller of claim 1, wherein the pastry tool includes a plurality of tines suitable for puncturing a pastry crust.

3. The dough roller of claim 1, wherein the pastry tool includes a protrusion suitable for crimping a pastry crust.

4. The dough roller of claim 2, wherein the handle is substantially U-shaped in cross-section transverse to the longitudinal axis of the handle.

5. The dough roller of claim 4, wherein the pastry tool spans the free edges of the cross-sectionally U-shaped handle.

6. The dough roller of claim 5, wherein the pastry tool is mountable to the handle in an elastic snap-fitting engagement.

7. The dough roller of claim 6, wherein the handle includes at least one notch proximate a free edge and the pastry tool includes at least one tab receivable in the at least one notch.

8. The dough roller of claim 3, wherein the handle is substantially U-shaped in cross-section transverse to the longitudinal axis of the handle.

9. The dough roller of claim 8, wherein the pastry tool spans the free edges of the cross-sectionally U-shaped handle.

10. The dough roller of claim 9, wherein the pastry tool is mountable to the handle in an elastic snap-fitting engagement.

11. A dough roller comprising:
    a handle having a longitudinal axis and at least one pair of fork arms, each said pair of fork arms being at a different opposite end of said handle;
    a roller mounted to each said pair of fork arms for rotation about an axis substantially transverse to said longitudinal axis; and
    a pastry tool removably attachable to said handle.

12. The dough roller of claim 11, wherein the pastry tool includes a plurality of tines suitable for puncturing a pastry crust.

13. The dough roller of claim 11, wherein the pastry tool includes a protrusion suitable for crimping a pastry crust.

14. The dough roller of claim 12, wherein the handle is substantially U-shaped in cross-section transverse to the longitudinal axis of the handle.

15. The dough roller of claim 14, wherein the pastry tool spans the free edges of the cross-sectionally U-shaped handle.

16. The dough roller of claim 15, wherein the pastry tool is mountable to the handle in an elastic snap-fitting engagement.

17. The dough roller of claim 16, wherein the handle includes at least one notch proximate a free edge and the pastry tool includes at least one tab receivable in the at least one notch.

18. The dough roller of claim 13, wherein the handle is substantially U-shaped in cross-section transverse to the longitudinal axis of the handle.

19. The dough roller of claim 18, wherein the pastry tool spans the free edges of the cross-sectionally U-shaped handle.

20. The dough roller of claim 19, wherein the pastry tool is mountable to the handle in an elastic snap-fitting engagement.

21. Consolidated pastry forming apparatus comprising roller means and finishing means,
    said roller means comprising:
       a first handle having a longitudinal axis and a first pair of fork arms at one end thereof and a second pair of fork arms at the opposite end thereof;
       a first roller mounted to the first pair of fork arms for rotation about an axis substantially transverse to the longitudinal axis of the handle;
       a second roller mounted to the second pair of fork arms for rotation about an axis substantially transverse to the longitudinal axis of the handle;
    said finishing means comprising:

a second handle having a longitudinal axis and respective opposed ends;
a plurality of tines said opposed end;
a protrusion at said other opposed end; and
said second handle being removably attachable to said first handle.

22. The consolidated pastry forming apparatus of claim 21 wherein said first handle is substantially U-shaped in transverse cross-section along said longitudinal axis and medially defines therealong opposite terminal side edge regions, and wherein said second handle is flattened, and has opposite lateral portions whose width is sufficient to span, and whose longitudinal configuration is suitable for extending along, portions of said opposite side edge regions.

23. The consolidated pastry forming apparatus of claim 22 wherein:
said first handle has a rabbet defined in and along a portion of each of said opposite side edge regions;
said second handle has outer and inner opposed facial regions;
said inner facial region has defined along a portion of each said opposite lateral portion thereof an insert but upstanding flange; and
when said inner facial region is placed over said opposite side edge regions, each said flange is engageable with a different one of said rabbets in an elastic snap-fit;
thereby to releasably attach said second handle to said first handle.

24. The consolidated pastry forming apparatus of claim 23 wherein:
in said first handle, each said rabbet further includes at least one notch proximate an open edge thereof;
in said second handle, each said flange further includes at least one tab; and
when said each flange is so engaged with a different one of said rabbets, each said tab is received in a different one of said notches.

25. The consolidated pastry forming apparatus of claim 24 wherein:
each said rabbet includes at least two notches in longitudinally spaced relationship relative to each other; and
each said flange includes at least two tabs in longitudinally spaced relationship to each other.

26. The consolidated pastry forming apparatus of claim 25 where, when said second handle is so releasably attached to said first handle, said first handle and said second handle cooperate to define a circumferentially extending surface that is smooth and conveniently hand graspable.

27. The consolidated pastry forming apparatus of claim 21 where, in said finishing means, said second handle, said plurality of tines and said protrusions are unitarily formed and said tines of said plurality of tines are linearly aligned with one another.

28. The consolidated pastry forming apparatus of claim 21 wherein said first handle, said first pair of fork arms and said second pair of fork arms are unitarily formed.

29. The consolidated pastry forming apparatus of claim 26 wherein each of said first pair of fork arms and said second pair of fork arms is formed as an extension of respective opposed leg portions of said U-shaped handle.

30. The consolidated pastry forming apparatus of claim 21 wherein said first roller is cross-sectionally cylindrically configured and said second roller is cross-sectionally progressively convexly configured so as to have a maximum diameter in a mid-region thereon, and said second roller is a shorter length than said first roller.

31. Consolidated pastry forming apparatus comprising in separatable combination roller means and finishing means;
said roller means comprising:
a first handle having a longitudinal axis and a first pair of fork arms at one end thereof and a second pair of fork arms at the opposite end thereof;
a first roller mounted to the first pair of fork arms for rotation about an axis substantially transverse to the longitudinal axis of the handle;
a second roller mounted to the second pair of fork arms for rotation about an axis substantially transverse to the longitudinal axis of the handle;
said first handle being substantially U-shaped in transverse cross-section along said longitudinal axis and medially defining therealong opposite terminal side edge regions;
said first handle having a rabbet defined in and along a portion of each of said opposite side edge regions;
said finishing means comprising:
a second handle having a longitudinal axis and respective opposed ends;
a plurality of tines at one said opposed end;
a protrusion at said other opposed end; and
said second handle being flattened, and having opposite lateral portions whose width is sufficient to span, and whose longitudinal configuration is suitable for extending along portions of said opposite side edge regions;
said second handle having outer and inner opposed facial regions;
said inner facial region having defined along a portion of each said opposite lateral portion thereof an inset but upstanding flange; and
when said inner facial region is placed over said opposite side edge regions, each said flange is engagable with a different one of said rabbets in an elastic snap-fit;
thereby to releasably attach said second handle to said first handle.

* * * * *

UNITED STATES PATENT AND TRADEMARK OFFICE
CERTIFICATE OF CORRECTION

PATENT NO. : 6,484,341 B2
DATED : November 26, 2002
INVENTOR(S) : Rolf Hefti and Walter Ruffner It is certified that error appears in the above-identified patent and that said Letters Patent is hereby corrected as shown below:

<u>Column 7,</u>
Line 3, replace "tines said" with -- tines at one said --.

Signed and Sealed this

Seventeenth Day of June, 2003

JAMES E. ROGAN
*Director of the United States Patent and Trademark Office*